US009838809B2

(12) United States Patent
Ryle et al.

(10) Patent No.: US 9,838,809 B2
(45) Date of Patent: Dec. 5, 2017

(54) SYSTEM AND METHOD FOR A REDUNDANT REAL-TIME WIRELESS RECEIVER NETWORK

(71) Applicant: Line 6, Inc., Calabasas, CA (US)

(72) Inventors: Marcus Ryle, Westlake Village, CA (US); Guy Coker, Rocklin, CA (US); James Purcell, Roseville, CA (US)

(73) Assignee: Line 6, Inc, Calabasas, CA (US)

( * ) Notice: Subject to any disclaimer, the term of this patent is extended or adjusted under 35 U.S.C. 154(b) by 37 days.

(21) Appl. No.: 14/523,346

(22) Filed: Oct. 24, 2014

(65) Prior Publication Data

US 2016/0119729 A1 Apr. 28, 2016

(51) Int. Cl.
*H04W 4/00* (2009.01)
*H04R 27/00* (2006.01)
*H04B 7/216* (2006.01)

(52) U.S. Cl.
CPC ....... *H04R 27/00* (2013.01); *H04R 2227/003* (2013.01); *H04R 2420/01* (2013.01); *H04R 2420/07* (2013.01); *H04R 2420/09* (2013.01)

(58) Field of Classification Search
CPC ... H04W 84/12; H04W 88/08; H04W 88/085; H04W 92/12
USPC .................................................. 370/328, 338
See application file for complete search history.

(56) References Cited

U.S. PATENT DOCUMENTS

| | | | | |
|---|---|---|---|---|
| 6,578,441 | B1 | 6/2003 | Jurenka et al. | |
| 8,509,692 | B2 | 8/2013 | Ryle et al. | |
| 8,588,432 | B1 * | 11/2013 | Simon | H04R 27/00 381/77 |
| 2002/0072330 | A1 | 6/2002 | Zhang | |
| 2005/0232207 | A1 | 10/2005 | Antoniadis et al. | |
| 2005/0254475 | A1 | 11/2005 | Kubler et al. | |
| 2010/0022189 | A1 | 1/2010 | Coker et al. | |
| 2012/0201360 | A1 | 8/2012 | Bugenhagen | |
| 2015/0085746 | A1 * | 3/2015 | Somayazulu | H04W 48/08 370/328 |

OTHER PUBLICATIONS

International Search Report and Written Opinion form a corresponding PCT application No. PCT/US15/56751 dated Dec. 29, 2015.

* cited by examiner

*Primary Examiner* — Lee Nguyen
(74) *Attorney, Agent, or Firm* — Blakely Sokoloff Taylor & Zafman

(57) ABSTRACT

Embodiments relate to a system and a method for a redundant real-time wireless receiver network. A Remote Digital Antenna Digital Receiver ("RDADR") is coupled to multiple Remote Digital Antenna ("RDAs"). The RDADR and the multiple RDAs are coupled via a digital bus. The multiple RDAs attempt to receive one or more digital signals from a transmitter. If the one or more digital signals are received without an error by one of the multiple RDAs, the RDA that received the one or more error-free digital signals sends the digital signals to the RDADR using the digital bus. The redundant real-time wireless receiver network provides a reliable and fault tolerant system to deliver digital audio signals in real-time.

39 Claims, 10 Drawing Sheets

SYSTEM AND METHOD FOR A REDUNDANT REAL-TIME WIRELESS RECEIVER NETWORK

BACKGROUND

During a recording or live performance, musicians and singers often desire the freedom of being able to have their musical instrument or voice audio signals being connected to recording or amplification devices without the encumbrance of an electrical cable.

Analog wireless systems that transmit audio signals over radio frequencies have existed for many decades and have been a viable solution but they include many limitations. Analog transmission systems for audio signals typically have limited bandwidth and dynamic range. The analog transmission system also is susceptible to unwanted radio interference being heard through the audio system. With an analog system, as the radio frequency degrades, or interference occurs, the audio quality degrades.

Radio signals, whether for analog or digital audio systems, fade over distance and are susceptible to fades from reflections that can cause the radio signal to be of an insufficient level at a receiver's antenna. Professional wireless systems often utilize a space diversity design, in which two antennas are used, either with a switch to a single receiver or to two independent receivers, in order to improve the likelihood that at least one of the antennas or receivers will pick up the radio signal adequately. Further spatial diversity can be achieved by separating the two antennas further, which can be achieved with remote antennas connected via a coaxial cable of sufficient quality so as to not degrade the RF signal being picked up by the remote antennas.

In typical digital wireless systems, once the radio signal has degraded to a level in which the digital data is unreadable, the audio signal must be muted. If using an existing digital protocol such as Wi-Fi, the receiver can request the retransmission of the digital audio data. Unfortunately, latency (e.g., delay time) is introduced to allow time for the retransmission. In many cases, the latency associated with the wireless transmission of digital audio can be easily tolerated. For example, digitally transmitting audio that is being played from a recording can contain latency in the tens of milliseconds without being obvious to the listener.

On the other hand, performers of live music can tolerate only very low latency (e.g., 5 milliseconds or less) before the latency can negatively affect the performance and interaction of musicians. As a result, present techniques for the retransmission of digital audio are not a viable solution because of the amount of time required for retransmission. Unfortunately, as commonly occurs when the RF signal of the digital audio is not properly received in real time, whether it is out of range or due to interference, some portion of the digital audio signal is lost.

DETAILED DESCRIPTION

Figure 1:
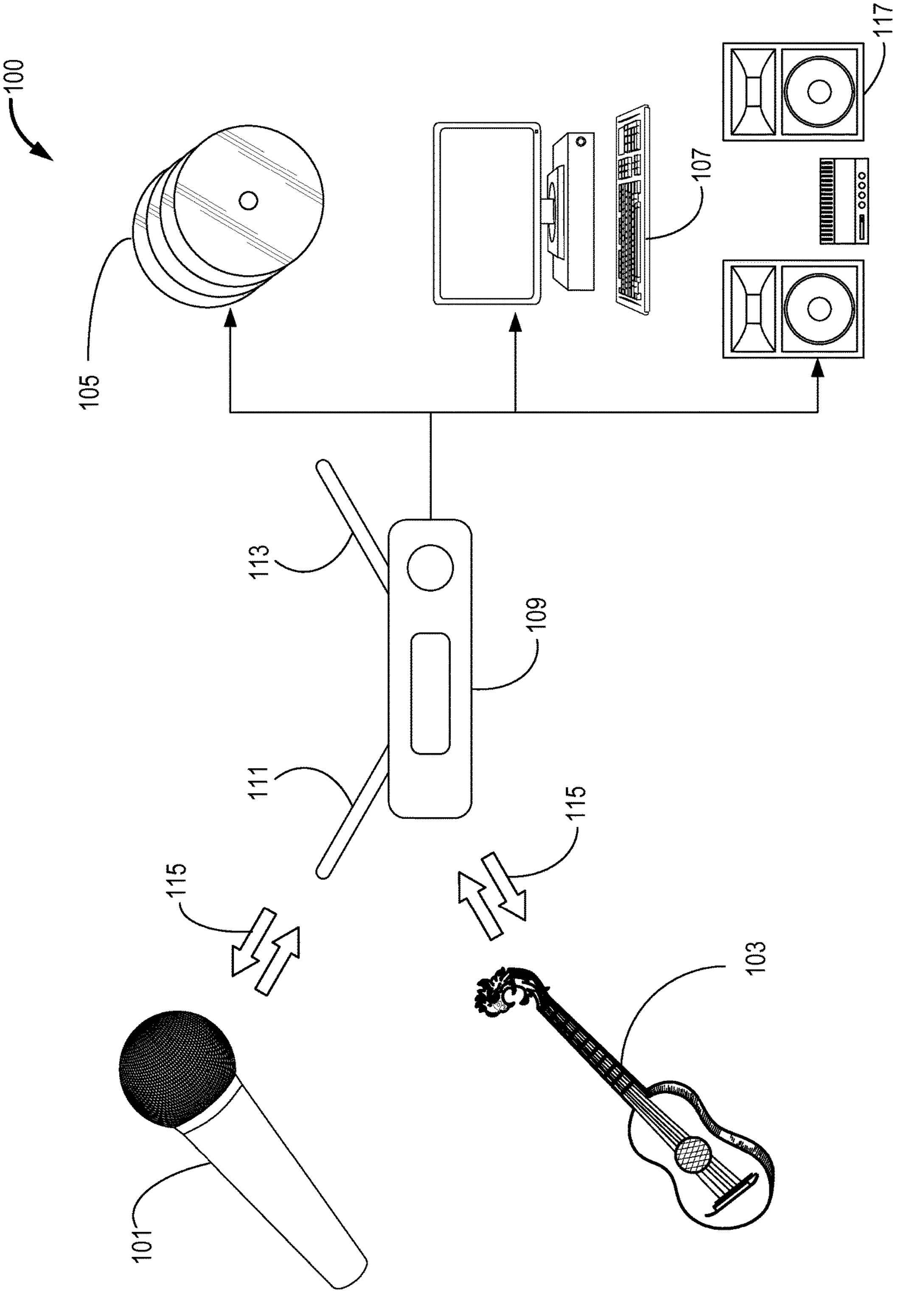
FIG. 1 is an illustration of one exemplary system for wireless transmission of digital audio signals.

In the following description, the various embodiments of a system and method for a redundant real-time wireless receiver network will be described in detail. However, such details are included to facilitate understanding of a system and method for a redundant real-time wireless receiver network and to describe exemplary embodiments for implementing a system and method for a redundant real-time wireless receiver network. Such details should not be used to limit a system and method for a redundant real-time wireless receiver network to the particular embodiments described because other variations and embodiments are possible while staying within the scope of a system and method for a redundant real-time wireless receiver network. Furthermore, although numerous details are set forth in order to provide a thorough understanding of a system and method for a redundant real-time wireless receiver network, it will be apparent to one skilled in the art that these specific details are not required in order to practice a system and method for a redundant real-time wireless receiver network. In other instances, details such as, well-known methods, types of data, protocols, procedures, components, processes, interfaces, electrical structures, circuits, etc. are not described in detail, or are shown in block diagram form, in order not to obscure a system and method for a redundant real-time wireless receiver network. Furthermore, aspects of a system and method for a redundant real-time wireless receiver network will be described in particular embodiments but may be implemented in hardware, software, firmware, middleware, or a combination thereof.

In the following description, certain terminology is used to describe features of the invention. For example, a "component," or "computing device," or 37 client device, or "computer" includes hardware and/or software module(s) that are configured to perform one or more functions.

Further, a "processor" is logic that processes information. Examples of a processor include a central processing unit (CPU), microprocessor, an application specific integrated circuit (ASIC), a digital signal processor (DSP), a micro-controller, a finite state machine, a field programming gate array (FPGA), combinatorial logic, etc.

A "module" or "software module" is executable code such as an operating system, an application, an applet, or a routine. Modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

A "connector," "interconnect," or "link" is generally defined as an information-carrying medium that establishes a communication pathway. Examples of the medium include a physical medium (e.g., electrical cable, electrical fiber, optical fiber, bus traces, etc.) or a wireless medium (e.g., air in combination with wireless signaling technology).

"Information" or "data stream" is defined as data, address, control, or any combination thereof. For transmission, information may be transmitted as a message, namely a collection of bits in a predetermined format. One particular type of message is a frame including a header and a payload, each having a predetermined number of bits of information.

Embodiments relate to a system and a method for a real-time wireless receiver network. In one embodiment, a plurality of RDAs is coupled to a Remote Digital Antenna Digital Receiver ("RDADR") via a digital bus. In this embodiment, the RDADR includes a processor and the multitude of RDAs includes a first Remote Digital Antenna ("RDA") that includes a processor and a second RDA that includes a processor. In this embodiment, the first RDA, the second RDA, and all the other RDAs from the multitude of RDAs attempt to receive one or more digital signals from a transmitter. If the one or more digital signals are received without an error (hereinafter "the one or more error-free digital signals") by the first RDA, the second RDA, or any other RDA from the multitude of RDAs, then the RDA that received the one or more error-free digital signals sends the one or more error-free digital signals to the RDADR using the digital bus. Additional features and/or advantages are provided in the description of embodiments provided herein.

With reference now to FIG. 1, FIG. 1 is an illustration of one exemplary system 100 for the wireless transmission of digital audio signals that is presently utilized.

System 100 may include an audio source, a digital receiver with internal or attached antennas, and an audio output device. Each of the structures, features, and/or characteristics of system 100 are described in more detail below.

In system 100, an audio source, such as musical instrument 103 and/or microphone 101, that can generate an analog audio signal and/or a digital audio signal may be coupled to a transmitter (not shown). It should be appreciated that the audio source is not limited to musical instrument 103 and/or microphone 101. The audio source can be a musical instrument, a microphone, and/or any device that is used to generate analog audio signals and/or digital audio signals as is known in the art. Furthermore, it should be appreciated that musical instrument 103 may be a guitar, a piano, a keyboard, a bass, and/or any musical instrument known in the art.

Typically, musical instrument 103 and/or microphone 101 is coupled to the transmitter via a wired connector (analog or digital), such as an electric cable or other cable that is known in the art. Additionally, musical instrument 103 and/or microphone 101 may have the transmitter directly attached or built into musical instrument 103 and/or microphone 101. Musical instrument 103 and/or microphone 101 can be used to generate one or more analog digital audio signals and/or digital audio signals that are processed by the transmitter (not shown) into one or more digital audio signals 115. The transmitter (not shown) can transmit the one or more digital audio signals 115 to digital receiver 109, which has antennas 111 and 113. Antennas 111 and 113 can be attached to digital receiver 109, or alternatively, antennas 111-113 can be built into digital receiver 109 so as to give the facade of digital receiver 109 being one device without any antennas.

The one or more digital audio signals 115 received by digital receiver 109 can be processed, by digital receiver 109, back into the one or more analog audio signals that were generated by musical instrument 103 and/or microphone 101. In addition, digital receiver 109 can send the one or more digital audio signals 115 and/or the one or more analog digital audio signals that were generated by the audio source to an audio output device.

The audio output device can be a play-back device (e.g., an amplifier or a public address system with speakers 117) and/or a computer 107 for storage 105. It should be appreciated that the audio output device is not limited to a play-back device, a public address system, and/or a computer. The audio device can be a play-back device, a computer, an analog mixer, a digital mixer, recording equipment, and/or any audio output device known in the art.

Figure 2:
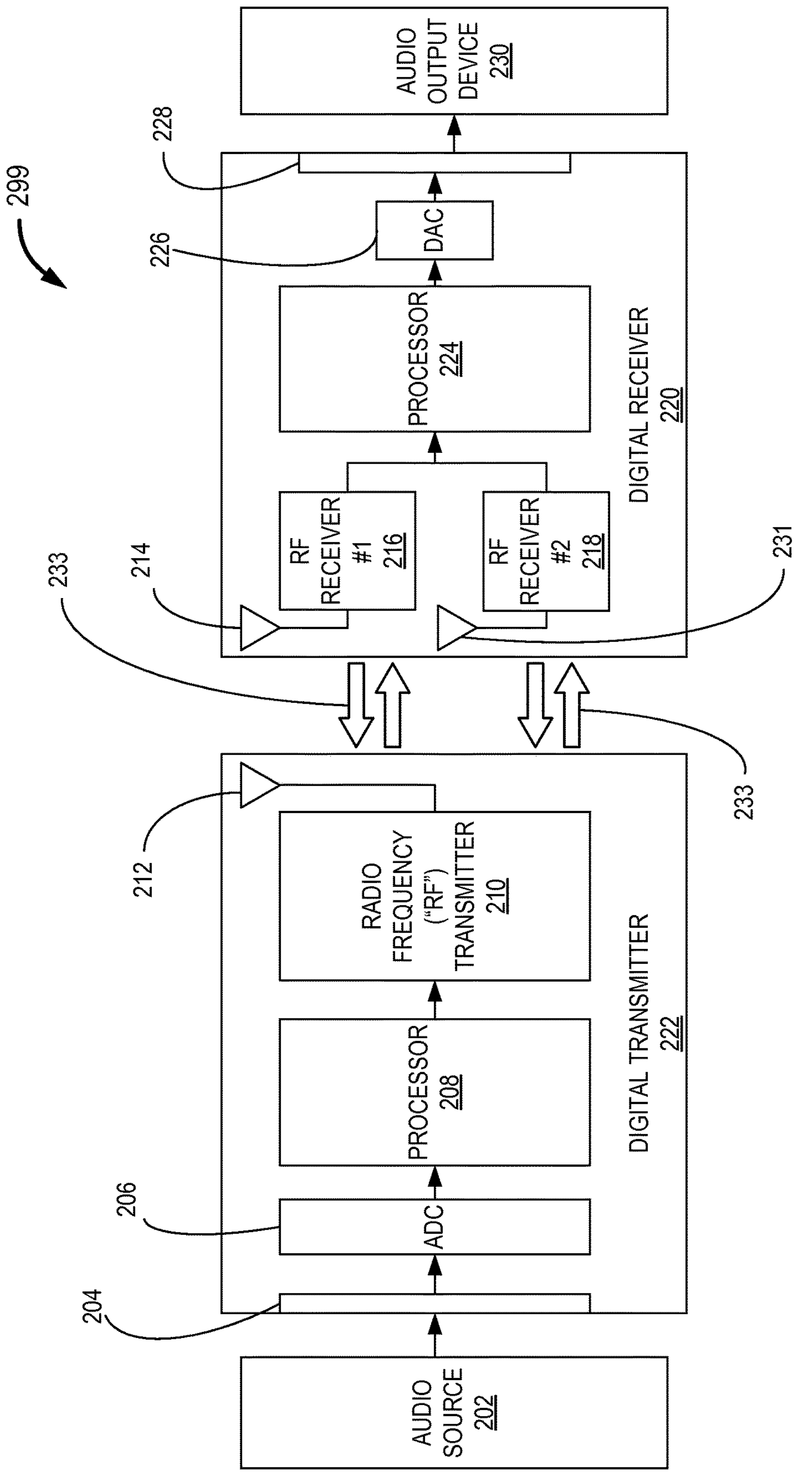
FIG. 2 is a block diagram of one exemplary system for wireless transmission of digital audio signals.

With additional reference to FIG. 2, FIG. 2 is a block diagram of one exemplary system 299 for the wireless transmission of digital audio signals that is presently utilized. System 299 of FIG. 2 is a block diagram illustration of system 100 of FIG. 1 that is described above.

System 299 of FIG. 2 includes audio source 202, digital transmitter 222, digital receiver 220, audio output device 230, and one or more digital audio signals 233. Each of the features, structures, and/or characteristics of system 299 are described in more detail below.

As shown in FIG. 2, audio source 202 can be a musical instrument, a microphone, and/or any other device that can generate analog and/or digital audio signals as is known in the art. Audio source 202 can generate one or more analog audio signals and/or one or more digital audio signals that can be sent to digital transmitter 222, which is coupled to audio source 202.

Digital transmitter 222 may include an input device 204, an analog to digital converter ("ADC") 206, a processor 208, a radio frequency ("RF") transmitter 210, and an antenna 212. Digital transmitter 222 may be coupled to audio source 202. More specifically, digital transmitter 222 may be coupled to audio source 202 via input device 204. Input device 204 can be an analog and/or a digital input device 204.

Digital transmitter 222 may optionally include an analog to digital converter ("ADC") 206 that is coupled to the input device 204 and to a processor 208. The one or more audio signals generated by audio source 202 that are received by digital transmitter 222 can be processed into one or more digital audio signals 233. It should be appreciated that ADC 206 may or may not be utilized dependent upon the type of audio source 202. In a first example, audio source 202 may be a digital musical instrument and/or digital microphone that generates one or more digital audio signals. In this first example, the digital musical instrument and/or digital microphone may be directly coupled by digital input device 204 to processor 208. In a second example, audio source 202 may be an analog musical instrument and/or analog microphone that generates one or more analog digital audio signals. In this second example, the analog musical instrument and/or analog microphone may be connected via analog input device 204 to ADC 206 such that the one or more analog audio signals are converted by ADC 206 into one or more digital audio signals for processing by processor 208.

Digital transmitter 222 may include a button selectable by a user to indicate whether or not an analog or digital musical instrument or microphone is being utilized to turn on or off ADC 206. Alternatively, digital transmitter 222 may simply determine, via input device 204, whether a digital or analog signal is being utilized and select or deselect ADC 206.

In either event, processor 208 may be utilized to process one or more digital audio signals 233 that may be sent to Radio Frequency ("RF") transmitter 210, which is coupled to processor 208 and antenna 212. RF transmitter 210 may utilize antenna 212 to transmit the one or more digital audio signals 233 to digital receiver 220. Digital receiver 220 includes RF receiver #1 216, RF receiver #2 218, processor 224, digital to analog converter ("DAC") 226, and output device 228, each of which are described below.

RF receiver #1 216 and RF receiver #2 218 may use antenna 214 and antenna 231, respectively, to receive the one or more digital signals 233 from digital transmitter 210. It should be appreciated that two RF receivers and two antennas are used by system 299 to increase the likelihood that the one or more digital audio signals 233 are received without any errors ("one or more error-free digital audio signals"). It should also be appreciated that more than two RF receivers and/or more than two antennas may be used by system 299, to increase the likelihood that the one or more digital audio signals are received without any errors.

If the one or more error-free digital signals 233 are received by RF receiver #1 216 and/or RF receiver #2 218, the one or more error-free digital signals 233 can be sent to processor 224, which is coupled to RF receiver #1 216 and/or RF receiver #2 218. Processor 224 can decode the one or more error-free digital signals 233.

Digital receiver 220 may optionally include a DAC 226 coupled to processor 224 to convert the one or more error-free digital signals 233 that were processed by processor 224 into one or more analog audio signals.

It should be noted that DAC 226 may or may not be utilized dependent upon the type of audio source 202 and/or audio output device 230. In a first example, audio source 202 may be a digital musical instrument and/or digital microphone that generates a digital audio signal without any conversion from an analog audio. In a second example, audio source 202 may be an analog musical instrument and/or analog microphone, which would necessitate converting the transmitted digital audio signal back into an analog audio signal by DAC 226. In this second example, audio output device 230, which is coupled to digital receiver 220, may only be able to process analog audio signals. In this second example, the one or more error-free digital signals 233 that are processed by processor 224 will be sent to DAC 226 for conversion into one or more analog audio signals.

Digital receiver 220 may include a button selectable by a user to indicate whether or not an audio source and/or an audio output device is analog or digital, so that digital receiver 220 can turn on or off DAC 226. Alternatively, digital receiver 220 may simply determine whether a digital or analog signal is needed and select or deselect DAC 226.

In either event, the error-free digital audio signals 233 can be sent from processor 224 and/or DAC 226 to output device 228 of digital receiver 220, which may send the error-free digital audio signals 233 to audio output device 230. Audio output device 230 is coupled to digital receiver 220. Audio output device 230 can be one or more amplifiers, recording devices, recording equipment, mixers, computers, stereos, and/or other audio output devices that are well known in the art.

Radio signals, whether for analog or digital audio systems, fade over distance and are susceptible to fades from reflections that can cause the radio signal to be of insufficient level at a receiver's antenna. Current professional wireless systems previously described, such as system 100 of FIG. 1 and system 299 of FIG. 2, often utilize a space diversity design, in which two or more antennas are used, either with a switch to a single receiver or to two or more independent receivers, in order to improve the likelihood that at least one of the antennas and/or receivers will pick up the radio signal adequately. Further, spatial diversity can be improved by separating the two antennas further. This may be accomplished with remote antennas connected via one or more coaxial cables of sufficient quality so as not to degrade the RF signal being picked up by the remote antennas. Unfortunately, there is often a low likelihood that one or more of the transmitted radio signals will be picked up adequately by current designs, which results in situations where the RF signal of the digital audio is not properly received in real time, either because the RF signal is out of range or because of interference, and thus at least some portion of the digital audio signal is lost and/or distorted by errors.

Figure 3:
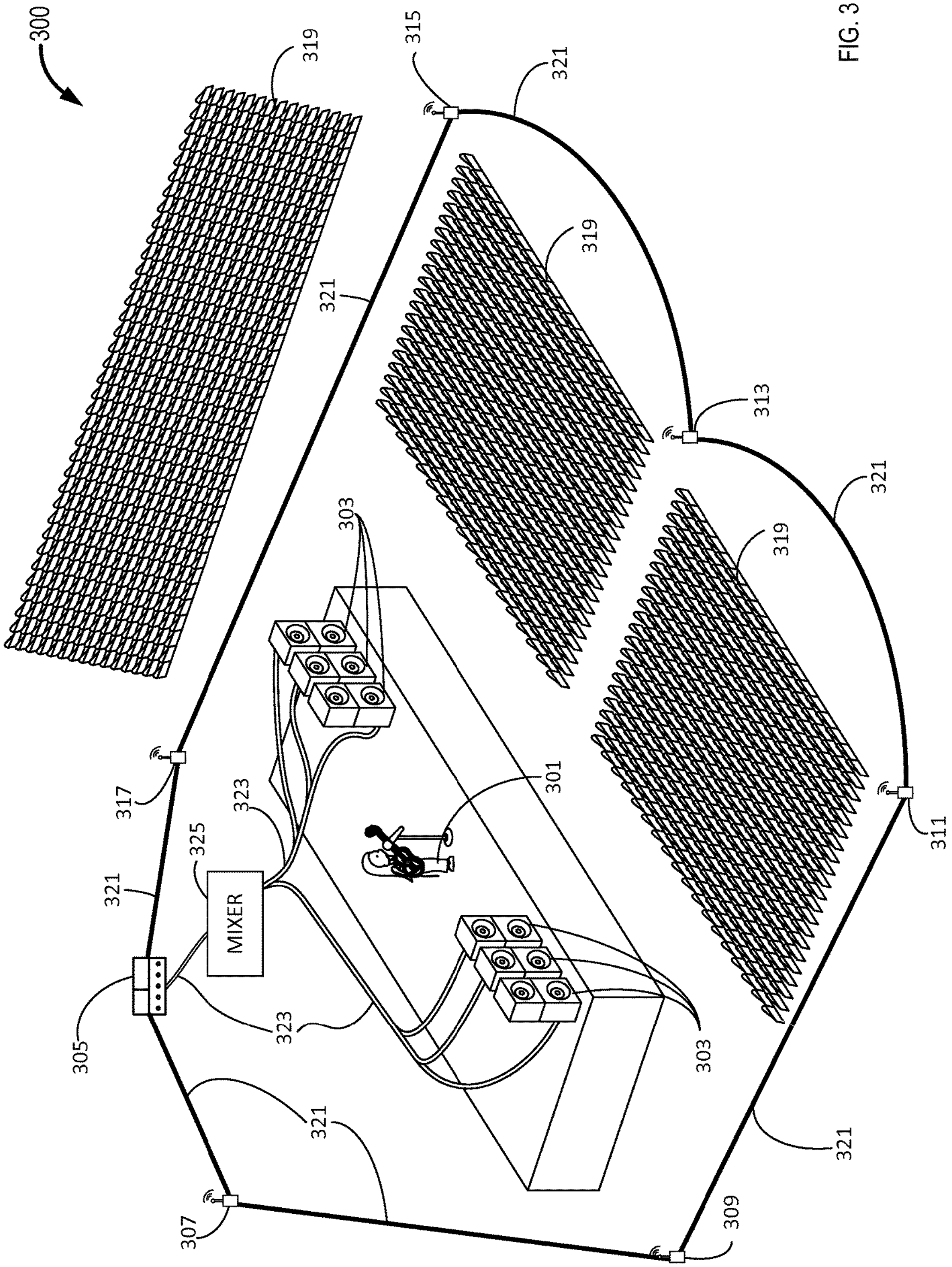
FIG. 3 is an illustration of an exemplary venue where one embodiment of a system for a real-time wireless receiver network is used for the wireless transmission of digital audio signals.

FIG. 3 is an illustration of an exemplary venue 300 where one embodiment of a system for a real-time wireless receiver network is used for the wireless transmission of digital audio signals.

As shown in venue 300 of FIG. 3, the system for a real-time wireless receiver network may comprise: Remote Digital Antenna ("RDA") 307, RDA 309, RDA 311, RDA 313, RDA 315, RDA 317, RDA Digital Receiver ("RDADR") 305, one or more audio sources that are used by performer 301 to generate one or more audio signals, one or more transmitters (not shown) to transmit the generated audio signal(s), a mixer 325, and at least one audio output device 303.

Performer 301 may use one or more audio sources, such as, but not limited to a microphone and/or a musical instrument, to communicate with audience 319 in venue 300. In one embodiment, the audio source(s) used by performer 301 generates one or more audio signals. In one embodiment, the one or more audio signals are converted into one or more digital audio signals by a transmitter, which transmits the one or more digital audio signals to Remote Digital Antenna ("RDA") 307, RDA 309, RDA 311, RDA 313, RDA 315, and/or RDA 317.

RDAs, such as RDA 307, RDA 309, RDA 311, RDA 313, RDA 315, and/or RDA 317, comprise at least one antenna and at least one radio frequency ("RF") receiver that enables each of those RDAs to receive one or more digital audio signals from a transmitter. For example, RDA 307 includes any number of RF receivers, that could be denoted by a variable such as "M" and each RF receiver of "M" RF receivers has any number of antennas, that could be denoted by a variable such as "N." Additional details about an RDA comprising at least one antenna and at least one RF receiver may be found in FIGS. 4-10, each of which is described below.

RDA 307, RDA 309, RDA 311, RDA 313, RDA 315, and/or RDA 317 may be coupled to each other and to RDADR 305 in a series configuration, a point-to-point configuration, a bus configuration, a star configuration, a ring configuration, a mesh configuration, a tree configuration, a daisy chain configuration and/or a hybrid configuration via digital bus 321.

Digital bus 321 may be synchronous or asynchronous. In one embodiment, digital bus 321 may be a bi-directional or uni-directional digital bus that comprises any wired digital methodology known in the art. For a first example, the digital bus can a bidirectional bus that is made from a wired digital methodology such as a twisted-pair transmission line. For a second example, the digital bus 321 may be standardized to conform with Category 6 cables ("CAT 6 cables") and/or Category 6a cables ("CAT 6a cables"), both of which have been standardized by the Telecommunications Industry Association ("TIA").

In one embodiment, RDA 307, RDA 309, RDA 311, RDA 313, RDA 315, and/or RDA 317 may be connected, via digital bus 321, to RDA Digital Receiver ("RDADR") 305. RDADR 305 may be a base unit that processes and/or decodes one or more digital signals received from the RDAs. In one embodiment, RDADR 305 may provide power and/or user commands to each of RDA 307, RDA 309, RDA 311, RDA 313, RDA 315, and/or RDA 317. In one embodiment, RDADR 305, may contain at least one antenna and/or at least one RF receiver, and can use the at least one antenna and/or at least one RF receiver to attempt to receive one or more error-free digital audio signals from a transmitter if the RDAs, such as RDA 307, RDA 309, RDA 311, RDA 313, RDA 315, and/or RDA 317, are unable to receive error-free versions of the digital audio signals.

In one embodiment, each RDA, such as each of RDA 307, RDA 309, RDA 311, RDA 313, RDA 315, and/or RDA 317, may be connected via its output and its input to digital bus 321. This enables each of the RDAs to be connected in a redundant network. It should be appreciated that although only six RDAs are shown in FIG. 3, the number of RDAs can be greater than or less than six RDAs. In other words, any number of RDAs may be utilized.

In one embodiment, each of RDA 307, RDA 309, RDA 311, RDA 313, RDA 315, and/or RDA 317 attempts to receive one or more radio frequency ("RF") digital audio signal(s) from one or more specified radio frequencies, e.g., one or more specified channels. As used herein, a "specified channel" and its variations refer to one or more wireless channels that have been specifically reserved for the transmission of one or more signals by a transmitter and/or for the receiving of one or more signals by an RDA so that the RDA can receive digital audio signals, via its one or more receivers, using the specifically reserved channel(s). In one embodiment, the one or more specified channels are used by the transmitter(s) to transmit the one or more digital audio signals.

In one embodiment, if one or more of RDA 307, RDA 309, RDA 311, RDA 313, RDA 315, and/or RDA 317 receives the one or more digital audio signals without any errors or distortions, e.g., the one or more error-free digital audio signals, then the one or more RDAs of RDA 307, RDA 309, RDA 311, RDA 313, RDA 315, and/or RDA 317 that received the error-free digital audio signal(s) outputs the error-free digital audio signal(s) onto the digital bus 321 so that the other RDAs obtain the signal(s) and so that at least one of the RDAs provides the signal(s) to RDADR 305.

In one embodiment, if one or more of RDA 307, RDA 309, RDA 311, RDA 313, RDA 315, and/or RDA 317 is not able to receive the error-free digital audio signal(s), then the one or more RDAs of RDA 307, RDA 309, RDA 311, RDA 313, RDA 315, and/or RDA 317 that did not receive the error-free digital audio signal(s) will instead pass the error-free digital audio signal(s) received on its digital bus input through to its digital bus output onto digital bus 321.

In one embodiment, if one or more of RDA 307, RDA 309, RDA 311, RDA 313, RDA 315, and/or RDA 317 receives the one or more digital audio signals with errors, interference, and/or distortions, e.g., one or more error-filled digital audio signals, then the one or more RDAs of RDA 307, RDA 309, RDA 311, RDA 313, RDA 315, and/or RDA 317 that received the one or more error-filled digital audio signals will instead pass the error-free digital audio signal(s) received on its digital bus input through to its digital bus output onto digital bus 321. In this way, a number of RDA units, such as, but not limited to RDA 307, RDA 309, RDA 311, RDA 313, RDA 315, and/or RDA 317, can be coupled to each other using one or more configurations as described above in FIG. 3, so that the RDADR 305 will always receive the error-free digital audio signal(s) as long as at least one of the RDA units is able to receive the digital audio signal(s) correctly.

One benefit of the previously described real-time wireless receiver network that is used in venue 300 of FIG. 3, is that one or more RDA units could be dispersed over a large area, effectively increasing the range of a wireless audio source to as large an area as desired based solely on the number of redundant RDA units deployed. As in the previously described example, six RDAs 307, 309, 311, 313, 315, and 317 are deployed over venue 300, which could be a large stadium or performance hall. It should be appreciated that any suitable number of RDAs may be deployed in a venue, such as venue 300.

In one embodiment, each RDA deployed in venue 300 may attempt to pass good digital audio data on in both directions of the digital bus, e.g., the good digital audio data can be passed using the inputs and/or the outputs of the RDAs onto the digital bus. This means that the digital bus may operate as a bidirectional bus so that all RDAs and/or RDADRs that are connected via the digital bus to any other RDA that received the good audio data can receive the error-free digital audio signal(s).

The previously described system used in venue 300 of FIG. 3 ensures that the only time in which there is not good audio data and/or error-free digital audio signal(s) on the digital bus is when none of the connected RDAs assigned to a specific wireless channel are able to receive good audio data and/or error-free digital audio signal(s) (e.g., when the transmitter is off). In this example, one or more of RDAs 307, 309, 311, 313, 315, and/or 317 flags the digital audio signal(s) that could not be received as bad digital audio signal(s) and notifies a base unit or a receiving unit, such as the RDAs 307, 309, 311, 313, 315, 317 and/or RDADR 305, of the bad digital audio signal(s), so that the base unit or the receiving unit mutes any specified channels associated with the bad digital audio data. As used herein, "muting a specified channel" and its variations refers to enabling an RDA or an RDADR to output silent audio signals in place of digital audio that have been flagged as bad digital audio signal(s) because none of one or more RDAs and/or RDADRs assigned to a specific wireless channel were able to receive good audio data and/or error-free digital audio signal(s) on that specified channel.

In one embodiment, each RDA, such as each of RDAs 307, 309, 311, 313, 315, and/or 317, that is connected via a digital bus, such as the digital bus 321, is configured to receive digital signal(s) using a specified channel (not shown) and to pass the error-free digital signal(s) that were received via the specified channel onto the digital bus.

In one embodiment, each RDA, such as each of RDAs 307, 309, 311, 313, 315, and/or 317, is configured to pass the data its receivers received onto a digital bus, such as digital bus 321. In this embodiment each RDA is also configured to pass on data (i.e., the error-free digital signal(s)) that was received via the other specified channels that were assigned to the other RDAs and passed onto digital bus 321 by these other RDAs. In other words, each RDA, such as each of RDAs 307, 309, 311, 313, 315, and/or 317, passes on all data on the digital bus, such as digital bus 321, from any additional wireless channels that the RDA was not to be assigned to, so that all digital data that was received via all the specified channels are available on every node, to every RDA, and/or to every RDADR in a system that is used in a venue, such the system that is used in venue 300. For example, if RDA 307 receives error-free digital signal(s) via a wireless channel 1 (not shown), RDA 309 receives error-free digital signal(s) via a wireless channel 2 (not shown), RDA 311 receives error-free digital signal(s) via a wireless channel 3 (not shown), RDA 313 receives error-free digital signal(s) via a wireless channel 4 (not shown), RDA 315 receives error-free digital signal(s) via a wireless channel 5 (not shown), and RDA 317 receives error-free digital signal (s) via wireless channel 6 (not shown), then each of RDAs 307, 309, 311, 313, 315, and/or 317 will pass the error-free digital signal(s) that it received via its specified channel onto digital bus 321. In this example, each of RDAs 307, 309, 311, 313, 315, and/or 317 will also pass on the error-free digital signal(s) on digital bus 321 that were received by the other RDAs via the other specified channels that the RDA was not assigned. In this way, each of the six RDAs of FIG. 3 receive error-free digital signals via a different channel, and all six RDAs of FIG. 3 allow all error-free data received using the six different channels to pass through their inputs and/or outputs (via digital bus 321) so that all data received using all 6 channels is available to each of RDA 307, RDA 309, RDA 311, RDA 313, RDA 315, RDA 317 and/or RDADR 305, even though the one or more receivers of each of RDAs 307, 309, 311, 313, 315, and/or 317 can only receive data via one specified channel.

In one embodiment, RDADR 305 is coupled, via an optional analog/digital bus 323, to a mixer 325 and/or one or more audio output devices 303. RDADR 305 processes and/or decodes the one or more error-free digital signals and sends the processed and/or decoded signals to the mixer 325 and/or the one or more audio output devices 303. For example, each of the audio output devices 303 may be a play-back device that receives audio signals that are processed by the mixer 325. The audio output devices 303 may also be a play-back device, a computer, a piece of recording equipment, a mixer, and/or any other type of audio output device known in the art. The at least one mixer 325 may be a digital mixer, an analog mixer, and/or any other type of mixer known in the art. It will be appreciated that more than one mixer 325 may be used in the system that is used in venue 300.

The analog/digital bus 323 that couples RDADR 305 to the mixer 325 and/or the audio output devices 303 may be a bidirectional bus, a uni-directional bus, and/or any other bus known in the art. Furthermore, analog/digital bus 323 can be an asynchronous bus or a synchronous bus. In one embodiment, analog/digital bus 323 can be a bus that is configured to send analog and/or digital data back and forth between two or more components, such as RDADR 305, mixer 325, and/or one or more audio output devices 303. In one embodiment, analog/digital bus 323 is a digital bus that is configured to send digital data back and forth between RDADR 305, mixer 325, and/or one or more audio output devices 303. In one embodiment, analog/digital bus 323 is an analog bus that is configured to send analog data back and forth between RDADR 305, mixer 325, and/or one or more audio output devices 303. In one embodiment, the decision of whether analog/digital bus 323 is a digital bus or an analog bus is based on whether RDADR 305, mixer 325, and/or one or more audio output devices 303 is designed to process digital data or analog data.

In one embodiment, analog/digital bus 323 is not used to couple RDADR 305 to mixer 325 and/or one or more audio output devices 303. In this embodiment, RDADR 305 is coupled to mixer 325 and/or audio output devices 303 via any other analog/digital coupling technology known in the art. In this embodiment, the decision of whether the analog/digital coupling technology transfers digital data or analog data is based on whether RDADR 305, mixer 325, and/or one or more audio output devices 303 is designed to process digital data or analog data.

Figure 4:
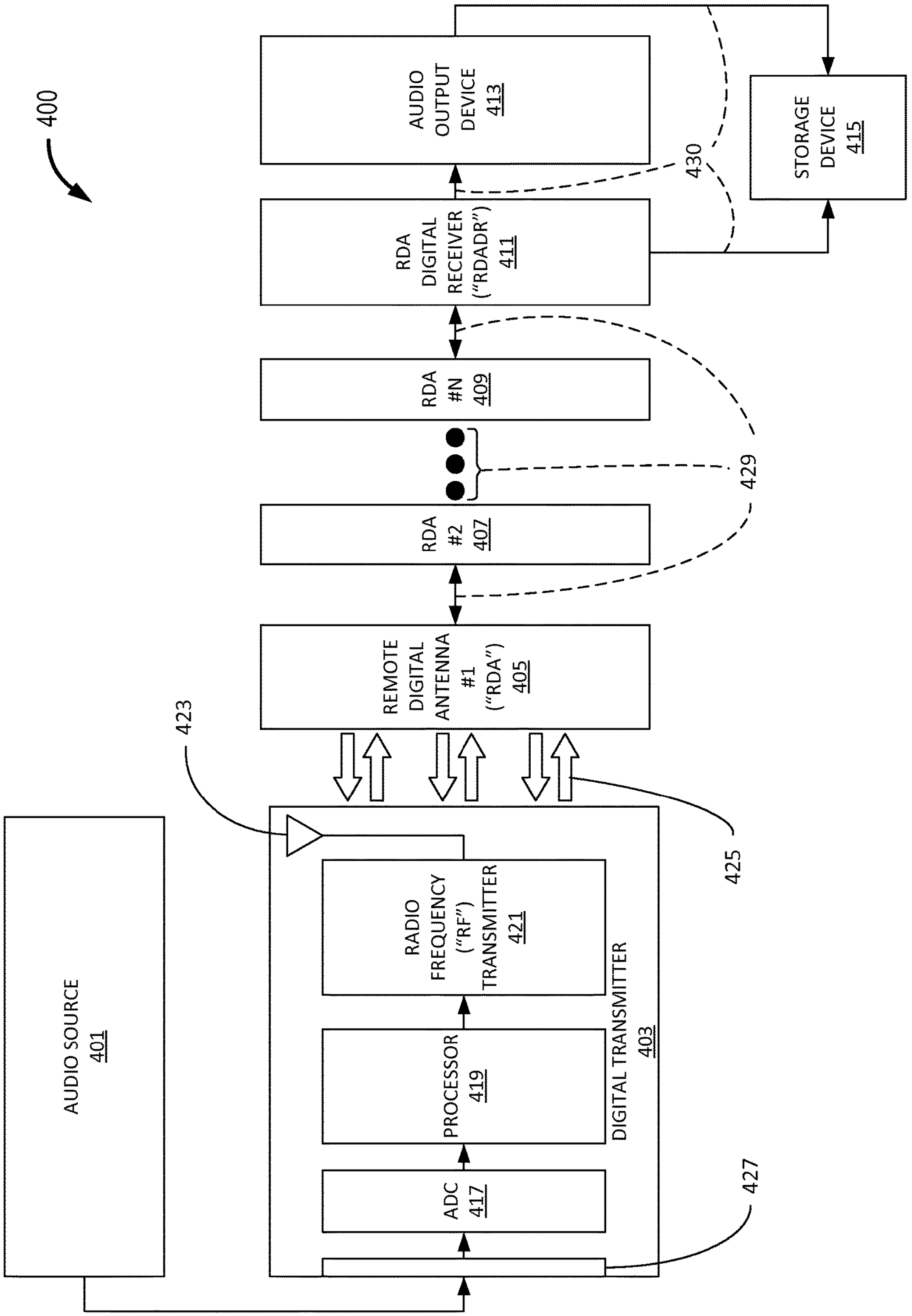
FIG. 4 is a block diagram illustrating one embodiment of a system for a real-time wireless receiver network.

FIG. 4 is a block diagram illustrating one embodiment of a system 400 for a real-time wireless receiver network. System 400 provides more details about an embodiment of a system for a real-time wireless receiver network that is used for the wireless transmission of digital audio signals, such as the system that is described above in FIG. 3.

System 400 may comprise audio source 401, digital transmitter 403, RDA #1 405, RDA #2 407, RDA #N 409, RDADR 411, audio output device 413, storage device 415, and digital bus 429. Each feature, structure, and/or characteristic of system 400 is discussed below.

Digital transmitter 403 may include input device 427, ADC 417, processor 419, RF transmitter 421, and antenna 423. RDA #1 405 may be similar to RDAs 307, 309, 311, 313, 315, and/or 317 that are described above with reference to FIG. 3. In one embodiment, RDA #1 405 may be coupled to RDA #2 407 and a predetermined number of other RDAs denoted by the number "N," so that the last RDA is RDA #N 409 using a series configuration, a point-to-point configuration, a bus configuration, a star configuration, a ring configuration, a mesh configuration, a tree configuration, a daisy chain configuration and/or a hybrid configuration. RDA #N 409 may be coupled to RDADR 411. RDADR 411 may be similar to RDADR 305 that is described above with reference to FIG. 3. In one embodiment, digital bus 429 is used to couple RDADR 411, RDA #1 405, RDA #2 407, and the predetermined number of other RDAs denoted by the number "N," so that the last RDA is RDA #N 409. Digital bus 429 may be similar to or the same as digital bus 321 that is described above in FIG. 3. For example, digital bus 429 enables RDADR 411, and each of the RDAs between RDA #1 405, RDA #2 407, and RDA #N 409 to transmit/receive digital signals bi-directionally to/from each other.

RDADR 411 may be coupled to audio output device 413, which is similar to one or more of the audio output devices that are described above with reference to FIG. 3. RDADR 411 may also be coupled to storage device 415. Further, storage device 415 may be coupled to the audio output device 413. In one embodiment, storage device 415 may be used to store one or more error-free digital signals 425 that are provided to the audio output device 413. In one embodiment, storage device 415 may be used to store one or more error-free digital signals 425 that have been processed and/or decoded by RDADR 411. In one embodiment, an optional bus 430 is used to couple RDADR 411 to audio output device and/or storage device 415. Optional bus 430 may be similar to or the same as bus 323 that is described above in FIG. 3.

In one embodiment, optional bus 430 is not used to couple RDADR 411 to audio output device 413 and/or storage device 415. In this embodiment, RDADR 411 is coupled to audio output device 413 and/or storage device 415 via any other analog/digital coupling technology known in the art. In this embodiment, the decision of whether the analog/digital coupling technology transfers digital data or analog data is based on whether RDADR 411, audio output device 413, and/or storage device 415 are designed to process digital data or analog data.

Storage device 415 may be any sort of storage medium that is known in the art. For example, storage device 415 can be persistent storage, storage that temporarily stores the audio signal(s), floppy disks, optical disks, CD-ROMs, magnetic-optical disks, read-only memories (ROMs), RAMs, EPROMs, EEPROMs, magnetic cards, optical cards, and/or any type of media suitable for storing analog and/or digital audio signals, processed audio signals, and/or decoded audio signals.

Figure 5:
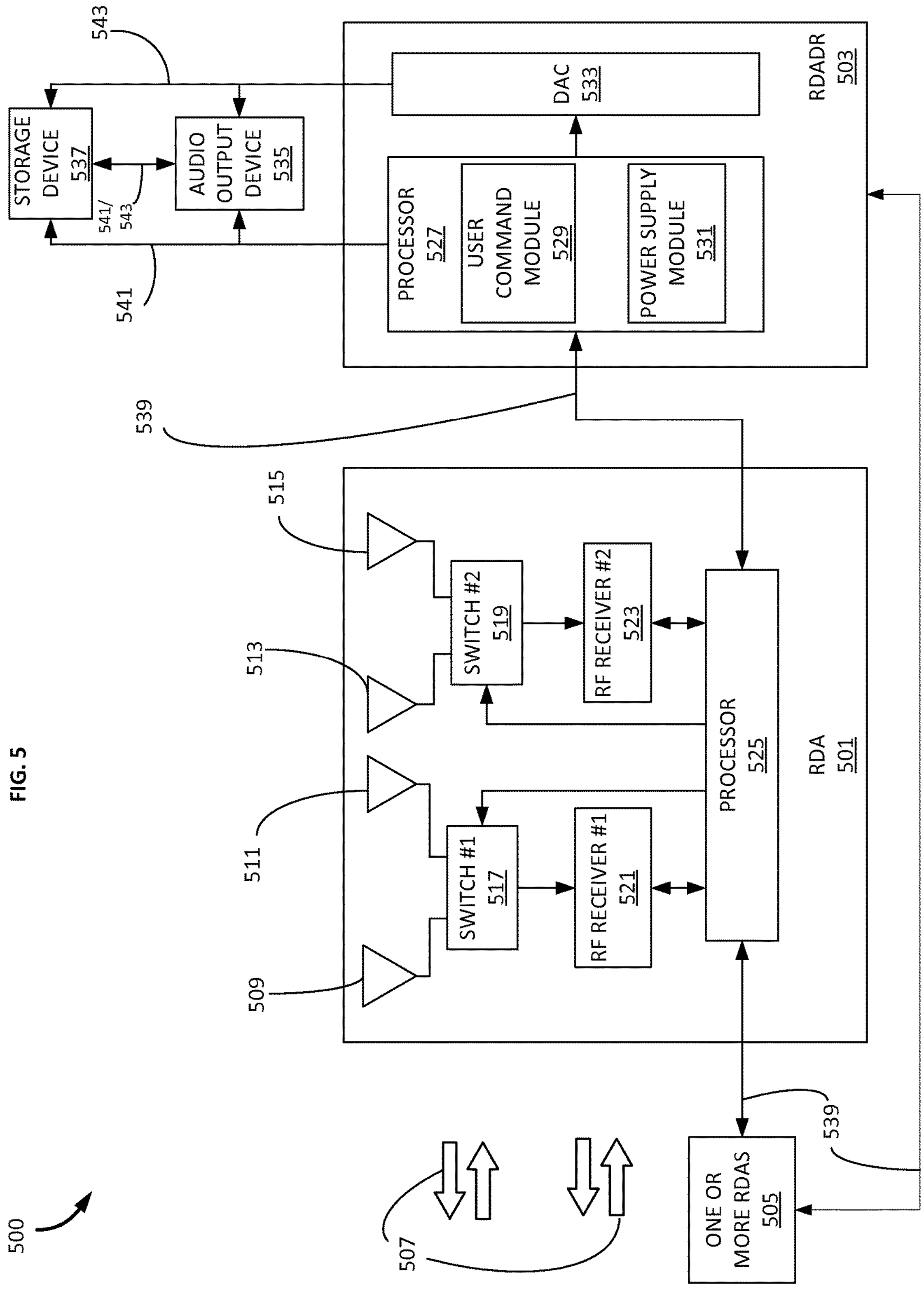
FIG. 5 is a block diagram illustrating a portion of one embodiment of a system for a real-time wireless receiver network that includes one embodiment of a Remote Digital Antenna (hereinafter "RDA") and one embodiment of a Remote Digital Antenna Digital Receiver (hereinafter "RDADR").

FIG. 5 is a block diagram illustrating a portion of one embodiment of a system 500 for a real-time wireless receiver network that includes one embodiment of Remote Digital Antenna ("RDA") 501 and one embodiment of a RDA digital receiver ("RDADR") 503.

The portion of system 500 described below provides more details about embodiments of RDAs and RDADRs of systems, such as the RDAs and RDADRs of the systems previously described in FIGS. 3 to 4 above. This portion of system 500 includes RDA 501, one or more RDAs 505, RDADR 503, audio output device 535, storage device 537, digital bus 539, digital bus 541, analog bus 543, and one or more digital audio signals 507. Each feature, structure, and/or characteristic of this portion of system 500 is described in detail below.

As shown in FIG. 5, RDA 501, one or more RDAs 505, and RDADR 503 are coupled to each other via a digital bus 539. Digital bus 539 may be a bidirectional bus, a uni-directional bus, or any bus that is known in the art. Furthermore, digital bus 539 can be an asynchronous bus or a synchronous bus.

In one embodiment, RDA 501, one or more RDAs 505, and RDADR 503 are coupled to each other via digital bus 539 in a series configuration, a point-to-point configuration, a bus configuration, a star configuration, a ring configuration, a mesh configuration, a tree configuration, a daisy chain configuration and/or a hybrid configuration. In one embodiment, a redundant topology utilizing digital bus 539 can be used to couple RDA 501, one or more RDAs 505, and RDADR 503 to each other in at least one of a series configuration, a point-to-point configuration, a bus configuration, a star configuration, a ring configuration, a mesh configuration, a tree configuration, a daisy chain configuration or a hybrid configuration. In this embodiment, the redundant topology provides cable redundancy to system 500 so that if a coupling (i.e., one or more cables of digital bus 539) that is used to couple RDA 501, one or more RDAs 505, and RDADR 503 to each other fails, data can still be transferred via other couplings of the redundant topology. In other words, any one cable in the loop can fail and the system will still function. For example, if a coupling of digital bus 539 that couples RDADR 503 directly with RDAs 505 fails, then data that needs to be sent between RDADR 503 and RDAs 505 can still be sent via a coupling of digital bus 539 that couples RDADR 503 with RDA 501, as well as, via a coupling of digital bus 539 that couples RDA 501 with RDAs 505.

System 500 also includes digital bus 541. Digital bus 541 can be a bus that is configured to send digital data back and forth between two or more components, such as RDADR 503, storage device 537, and/or audio output device 535. In one embodiment, digital bus 541 is digital bus that is configured to send digital data back and forth between RDADR 503, storage device 537, and/or audio output device 535.

System 500 can optionally include analog bus 543. Analog bus 543 can be a bus that is configured to send analog data back and forth between RDADR 503, storage device 537, and/or audio output device 535. In one embodiment, the decision of whether to include analog bus 541 in system 500 is based on whether audio output device 535 is designed to process digital data or analog data and/or whether storage device 537 is designed to store digital data or analog data.

Each of digital bus 541 and optional analog bus 543 can be a bidirectional bus, a uni-directional bus, or any other type of bus that is known in the art. Further, each of digital bus 541 and analog bus 543 can be a synchronous bus or an asynchronous bus. In one embodiment, digital bus 541 is used to couple audio output device 535 and/or storage device 537 with processor 527 of RDADR 503. In one embodiment, analog bus 543 is used to couple audio output device 535 and/or storage device 537 with DAC 533 of RDADR 503.

In one embodiment, RDA 501 of FIG. 5 comprises processor 525, RF receiver #1 521, RF receiver #2 523, antenna 509, antenna 511, antenna 513, antenna 515, switch #1 517, and switch #2 519. In one embodiment, antenna 509, antenna 511, antenna 513, and antenna 515 work together with switch #1 517, and switch #2 519 to achieve spatial diversity so as to improve the likelihood that one or more digital audio signals 507 are received by RDA 501 without any errors or distortions. In one embodiment, antennae 509, 511, 513, and 515 receive signals 507 via one or more specified channels. Given that the use of antennas with switches to receive one or more error-free digital audio signals is well known in the art, the operations of antenna 509, antenna 511, antenna 513, antenna 515, switch #1 517, and switch #2 519 will not be discussed in detail.

In one embodiment, RDA 501 includes RF receiver #1 521 and RF receiver #2 523 that work with switch #1 517, and switch #2 519, respectively, to receive one or more error-free signals 507. In one embodiment, unlike previous implementations, the error-free signals 507 being output and/or provided by RDA 501 are not raw analog RF signal (s). This means that, in one embodiment, RDA 501 includes RF receiver #1 521 and RF receiver #2 523 to enable it to receive the one or more error-free signals 507 in their digital format and to enable it to provide the digital versions of the error-free audio signal(s) onto digital bus 539.

In one embodiment, RF receiver #1 521 and/or RF receiver #2 523 provide the received error-free signal(s) 507 to processor 525 of RDA 501. In one embodiment, processor 525 processes and/or decodes the one or more error-free signals 507. Processor 525 processes and/or decodes the one or more error-free signals 507 to determine if the signal(s) are error-free. In particular, processor 525 processes and/or decodes the one or more error-free signals 507 to determine the number and/or severity of errors in the signal(s).

In one embodiment, after processing and/or decoding the one or more error-free signals 507, processor 525 outputs the one or more error-free signals 507 onto digital bus 539, so that the one or more error-free signals 507 are available to one or more RDAs 505 and/or RDADR 503. If RDA 501 is unable to receive the one or more error-free digital signals 507 using RF receiver #1 521 and/or RF receiver #2 523, then RDA 501, via processor 525, attempts to obtain the error-free digital signal(s) from one or more other RDAs 505 using digital bus 539.

In this embodiment, RDA 501 has an increased likelihood of receiving the error-free signal(s) 507 because RDA 501 can receive the one or more error-free signals 507 from RF receiver #1 521, RF receiver #2 523, and/or RDAs 505.

In one embodiment, digital bus 539 is used by RDA 501 and/or RDAs 505 to provide the one or more error-free signals 507 to RDADR 503. RDADR 503 includes a processor 527, and a digital to analog converter ("DAC") 533, which are described below.

In one embodiment, processor 527 of RDADR 503 comprises a user command module 529 and a power supply module 531. User command module 529 is included in RDADR 503 to enable a user to provide at least one user command to RDADR 503 that is sent to RDA 501 and/or RDAs 505, via digital bus 539. For example, at least one user command includes information about the digital audio signal(s) 507 that are to be transmitted, information about at least one specified channel that will be used to transmit the digital signal(s) 507, information related to setting up one or more parameters of RDA 501 and/or RDAs 505, information related to decoding, processing, and/or reporting of non-audio data received from the transmitter, information related to diagnostic data about the one or more signals 507, and information related to a predicted form of the one or more error-free signals 507. In one embodiment, diagnostic data includes radio strength, error rate, and/or any other characteristics of digital audio signals that are known in the art.

In one embodiment, power supply module 531 of processor 527 is used by RDADR 503 to provide power to RDA 501 and/or RDAs 505 via digital bus 539. In one embodiment, one or more inputs of RDA 501 and/or RDAs 505 are coupled to RDADR 503 using a digital bus 539 that has been standardized to CAT 6 cable and/or the CAT 6a cable specifications, as described above. Using a digital bus 539 that conforms to the CAT 6 cable and/or the CAT 6a cable specifications simplifies setup and cable selection for embodiments of a system for a real-time wireless receiver network that is used for the wireless transmission of digital audio signals. Given that provision of power to devices using a CAT 6 cable and/or a CAT 6a cable is well known, it is not discussed in detail.

In one embodiment, processor 527 of RDADR 503 processes and/or decodes the one or more error-free signals 507. In one embodiment, processor 527 processes and/or decodes the error-free digital signals 507 to combine non-audio data with the error-free digital audio signal(s) or to perform a user pre-defined function that is included in a user command. In one embodiment, the processed or unprocessed error-free signal(s) 507 are provided by processor 527 to a DAC 533 for further processing to convert the error-free signal(s) 507 from their digital forms into analog forms. In one embodiment, RDADR 503 provides the unprocessed or processed error-free digital audio signal(s) to audio output device 535. Audio output devices have been previously described. In one embodiment, audio output device 535 may provide the unprocessed or processed error-free digital audio signal(s) to storage device 537 for storage.

Figure 6:
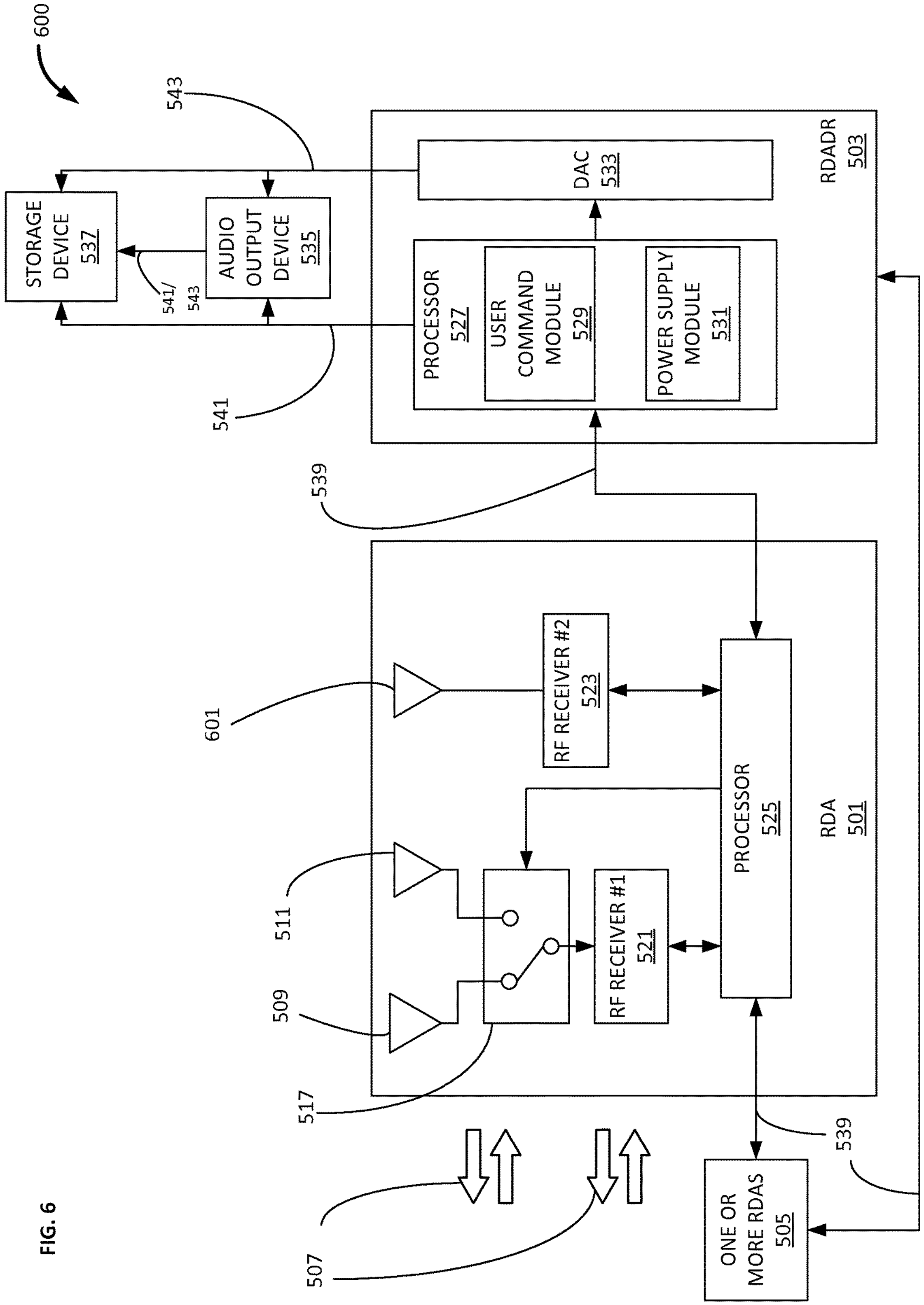
FIG. 6 is a block diagram illustrating a portion of one embodiment of a system for a real-time wireless receiver network that includes one embodiment of an RDA with varying designs for achieving spatial diversity and one embodiment of an RDADR.

FIG. 6 is a block diagram illustrating a portion of one embodiment of a system 600 for a real-time wireless receiver network that includes one embodiment of Remote Digital Antenna ("RDA") with varying forms of achieving spatial diversity and one embodiment of a digital receiver.

System 600 of FIG. 6 is a modification of system 500 of FIG. 5 that is described above. Some of features, structures, and/or characteristics of system 500 of FIG. 5 described above can be similar to or the same as some of the corresponding features, structures, or characteristics of system 600 of FIG. 6, and as a result, are identified with the same reference numerals. For the sake of brevity, only the differences between system 600 and system 500 will be described in the discussion relating to FIG. 6.

One difference between system 600 and system 500 relates to the varying designs of spatial diversity that can be used to improve the likelihood that RDA 501 receives the error-free digital signals 507 from a transmitter. In one embodiment of system 600, spatial diversity is achieved by using varying designs of antennas with each of RF receiver #1 521 and RF receiver #2 523. In one embodiment, RF receiver #1 521 retains the same design that was described above in FIG. 500, with the only difference being that details have been added to show some inner structures of switch #1 517. In one embodiment, RF receiver #2 523 has a design that was not described by FIG. 500. In this embodiment, RF receiver #2 523 is connected to a single antenna 601.

Figure 7:
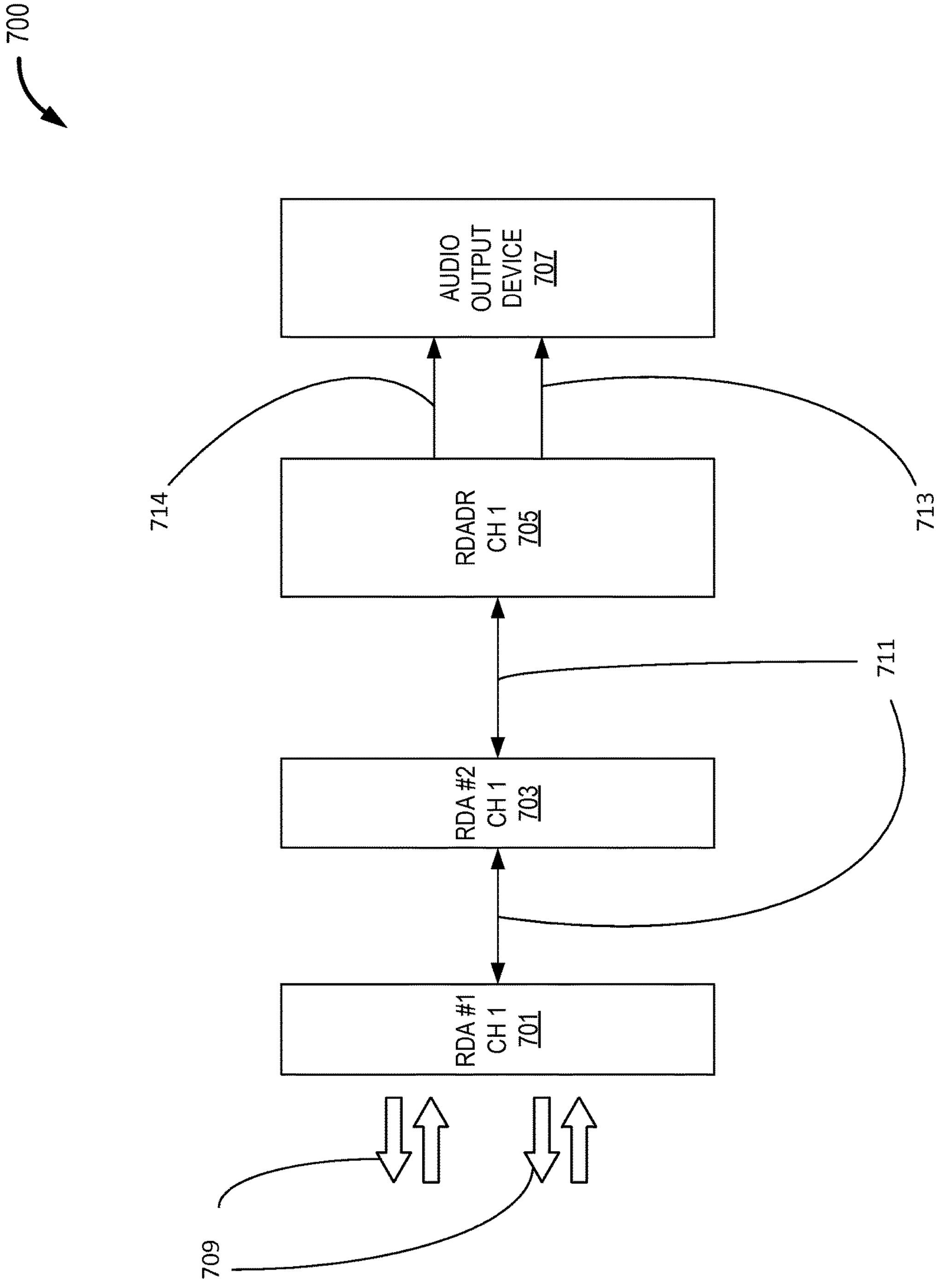
FIG. 7 is a block diagram illustrating a portion of one embodiment of a system for a real-time wireless receiver network that includes multiple RDAs that receive digital audio signals on a specified channel.

FIG. 7 is a block diagram illustrating a portion of one embodiment of a system 700 for a real-time wireless receiver network that includes multiple RDAs that receive digital audio signals on a specified channel. The portion of system 700 described below provides more details about embodiments of RDAs and RDADRs of systems, such as the RDAs and RDADRs of the systems described above with regard to FIGS. 3 to 6. Some features, structures, and/or characteristics of the portion of system 700 that is described below can be similar or the same as some of the corresponding features, structures, or characteristics of the systems of FIGS. 3 to 6 that were described above. For the sake of brevity, only the differences between system 700 and the systems of FIGS. 3 to 6 will be described in the discussion relating to FIG. 7.

This portion of system 700 includes multiple RDAs. As shown in FIG. 7, this portion of system 700 includes RDA #1 701, RDA #2 703, RDADR 705, audio output device 707, digital bus 711, digital bus 713, analog bus 714, and one or more digital audio signals 709. In one embodiment of system 700 and as described above in system 300 of FIG. 3, multiple RDAs attempt to receive one or more digital audio signals from one or more specified radio frequencies, e.g., one or more specified channels. The one or more specified channels are used by the transmitter to transmit the one or more digital audio signals. For example, there may be two RDAs 701 and 703 that are configured to attempt to receive the one or more digital audio signals 709 from a transmitter (not shown) on a specified channel that is designated as "CH 1." Furthermore, this embodiment of system 700 includes a RDADR 705 that is also assigned to the specified channel "CH 1" and to the two RDAs 701 and 703 so that only the one or more error-free digital audio signals 709 that are obtained on the specified channel "CH 1" are processed and/or decoded by RDADR 705 and then sent to audio output device 707.

It should be appreciated that even though only two RDAs are shown in this embodiment of system 700, more or less than two RDAs can be used in one or more embodiments of system 700. It should also be appreciated that even though only one specified channel is shown in this embodiment of system 700, more than one specified channel can be used in one or more embodiments of system 700. Furthermore, it should be appreciated that even though only one RDADR is shown in this embodiment of system 700, more than one RDADR can be used in one or more embodiments of system 700. It should be appreciated that even though only one audio output device is shown in this embodiment of system 700, more than one audio output device can be used in one or more embodiments of system 700.

As shown in FIG. 7, RDA #1 701, RDA #2 703, and RDADR 705 are coupled to each other via a digital bus 711. In one embodiment, digital bus 711 is similar to the digital bus 539 that is described above with reference to FIG. 5. System 700 also includes digital bus 713 that is used to couple RDADR 705 to audio output device 707. In one embodiment, digital bus 713 is similar to digital bus 541 that is described above with reference to FIG. 5. Moreover, system 700 includes analog bus 714 that is also used to couple RDADR 705 to audio output device 707. In one embodiment, analog bus 714 is similar to analog bus 543 that is described above with reference to FIG. 5.

Figure 8:
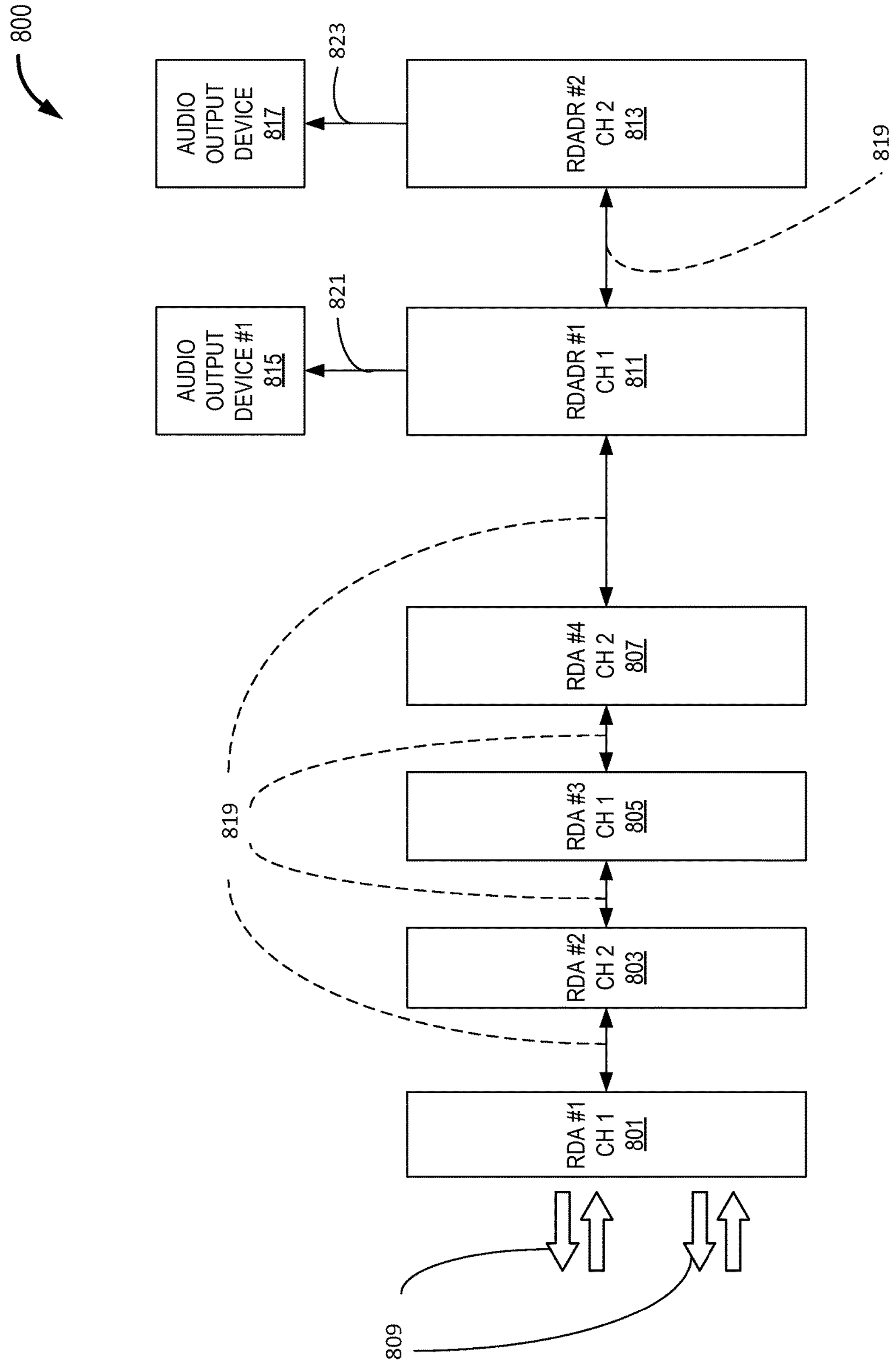
FIG. 8 is a block diagram illustrating a portion of one embodiment of a system for a real-time wireless receiver network that includes multiple RDAs that receive digital audio signals on two specified channels.

FIG. 8 is a block diagram illustrating a portion of one embodiment of a system 800 for a real-time wireless receiver network that includes multiple RDAs that receive digital audio signals on two specified channels. The portion of system 800 described below provides more details about embodiments of RDAs and RDADRs of systems, such as the RDAs and RDADRs of the systems described above with regard to FIGS. 3 to 7. Some features, structures, and/or characteristics of the portion of system 800 that is described below can be similar or the same as some of the corresponding features, structures, or characteristics of the systems of FIGS. 3 to 7 that were described above. For the sake of brevity, only the differences between system 800 and the systems of FIGS. 3 to 7 will be described in the discussion relating to FIG. 8.

In one embodiment of system 800 of FIG. 8, this portion of system 800 includes RDA #1 801, RDA #2 803, RDA #3 805, RDA #4 807, RDADR #1 811, RDADR #2 813, audio output device #1 815, audio output device #2 817, digital bus 819, analog/digital bus 821, analog/digital bus 823, and one or more digital audio signals 809.

System 800 may be similar to the system 700 of FIG. 7 that is described above with regard to FIG. 7. As shown in FIG. 8, RDA #1 801, RDA #2 803, RDA #3 805, RDA #4 807, RDADR #1 811, and RDADR #2 813 are coupled to each other via a digital bus 819. In one embodiment, digital bus 819 is similar to the digital bus 539 that is described above with reference to FIG. 5. System 800 also includes analog/digital bus 821 that is used to couple RDADR #1 811 to audio output device #1 815. In one embodiment, analog/digital bus 821 is similar to digital bus 541 and/or analog bus 543 that are each described above with reference to FIG. 5. Furthermore, system 800 includes analog/digital bus 823 that is used to couple RDADR #2 813 to audio output device #2 817. In one embodiment, analog/digital bus 823 is similar to digital bus 541 and/or analog bus 543 that are each described above with reference to FIG. 5.

In system 800, there are four RDAs 801, 803, 805, and 807 that are configured to attempt to receive the one or more digital audio signals 809 from a transmitter (not shown) on two specified channels that are designated as “CH 1” and “CH 2,” respectively. In one embodiment, RDA #1 801, and RDA #3 805 are assigned to receive one or more digital audio signals on specified channel “CH 1,” while RDA #2 803 and RDA #4 807 are assigned to receive one or more digital audio signals on specified channel “CH 2.” In one embodiment, the signals on “CH 1” and “CH 2” can be generated by different audio sources (not shown) as described above with reference to FIG. 3.

One embodiment of system 800 includes two RDADRs 811 and 813 that are assigned to specified channel “CH 1” and specified channel “CH 2,” respectively. In one embodiment, RDADRs 811 is assigned to RDA #1 801, RDA #3 805, and/or specified channel channel “CH 1” so that only those digital audio signal(s) that are assigned to specified channel channel “CH 1” are processed and/or decoded by RDADR 811 and then sent to audio output device 815. In one embodiment, RDADRs 813 is assigned to RDA #2 803, RDA #4 807, and/or specified channel “CH 2” so that only those digital audio signal(s) that are assigned to specified channel “CH 2” are processed and/or decoded by RDADR 813 and then sent to audio output device 817.

In one embodiment, each RDA, such as each of RDAs 801, 803, 805, and/or 807, is configured to pass the data its receivers received onto a digital bus, such as digital bus 819. In this embodiment, each RDA is also configured to pass on data (i.e., the error-free digital signal(s)) that was received via the other specified channels that were assigned to the other RDAs and passed onto digital bus 819 by these other RDAs. Thus, each RDA, such as each of RDAs 801, 803, 805, and/or 807, passes on all data on the digital bus, such as digital bus 819, from any additional wireless channels that the RDA was not to be assigned to, so that all digital data that was received via all the specified channels, such as channels CH 1 and CH 2, is available on every node, to every RDA, and/or to every RDADR in a system, such system 800. In other words, each of RDA #1 801, RDA #2 803, RDA #3 805, RDA #4 807, RDADR #1 811, RDADR #2 813 provides all data obtained from its specified channel onto digital bus 819, which in turn provides data from all channels bidirectionally to each of RDA #1 801, RDA #2 803, RDA #3 805, RDA #4 807, RDADR #1 811, RDADR #2 813. This enables system 800 to work without the need for retransmission of the signals in the event of an interference.

Figure 9:
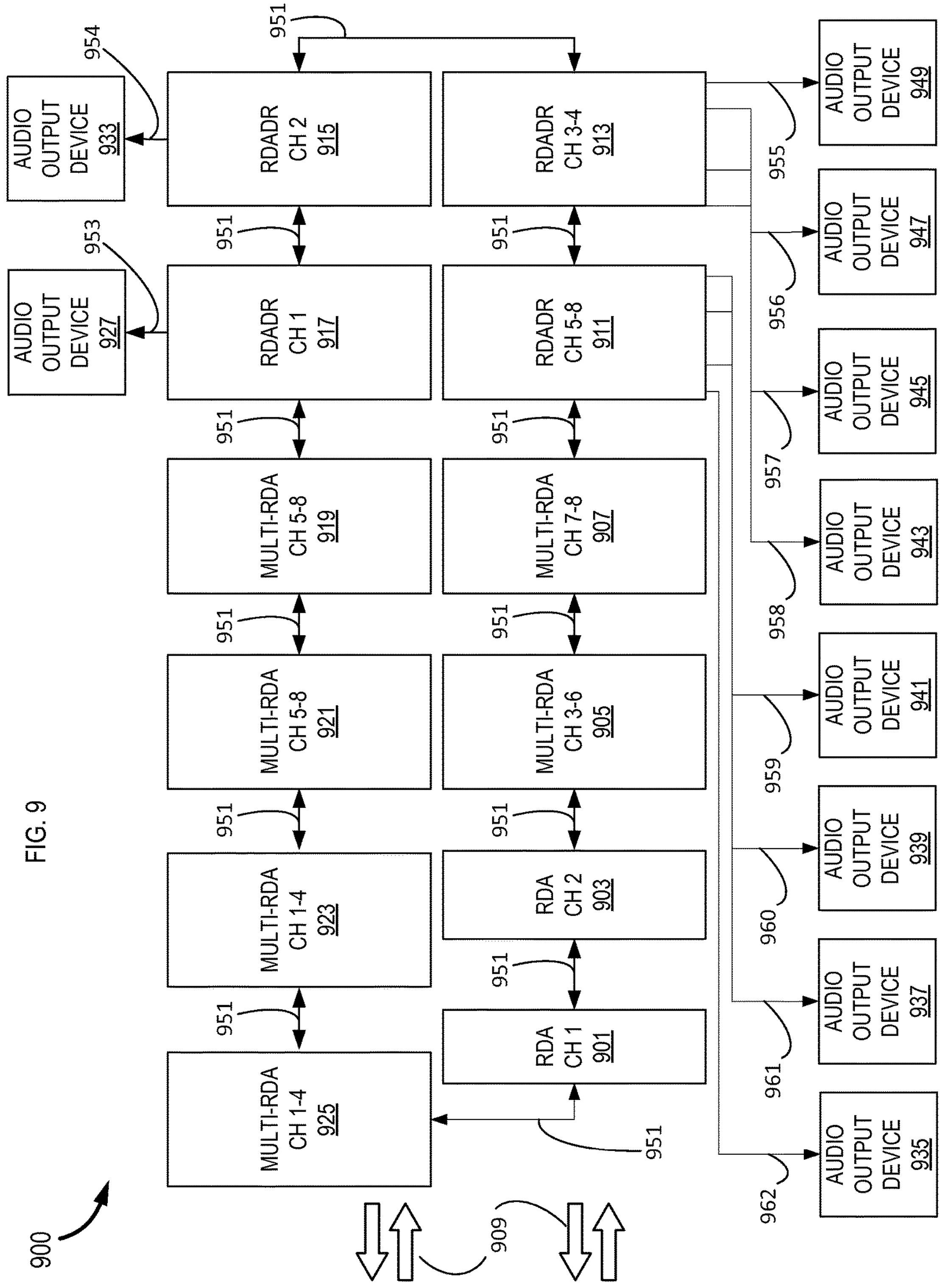
FIG. 9 is a block diagram illustrating a portion of one embodiment of a system for a real-time wireless receiver network that includes multiple RDAs that receive digital audio signals on multiple specified channels and provide the corresponding digital audio signals to multiple RDADRs.

FIG. 9 is a block diagram illustrating a portion of one embodiment of a system 900 for a real-time wireless receiver network that includes multiple RDAs that receive digital audio signals on multiple specified channels and provide the corresponding digital audio signals to multiple receivers.

The portion of system 900 described below provides more details about embodiments of RDAs and RDADRs of systems, such as the RDAs and RDADRs of the systems described above in FIGS. 3 to 8. Some features, structures, and/or characteristics of the portion of system 900 that are described below can be similar or the same as some of the corresponding features, structures, or characteristics of the systems of FIGS. 3 to 8 that were described above. For the sake of brevity, only the differences between system 900 and the systems of FIGS. 3 to 10 will be described in the discussion relating to FIG. 9.

System 900 is similar to system 800 of FIG. 8, which is described above. In one embodiment, system 900 includes different types of RDAs. For a first example, RDA #1 901 and RDA #2 903 are each assigned to specified channel “CH 1” and “CH 2,” respectively. For a second example, multi-RDA 905 is assigned to specified channels “CH 3,” “CH 4,” “CH 5,” and “CH 6.” As used herein, a “multi-RDA” refers to two or more RDAs that are housed on the same device.

For the sake of brevity, it is to be appreciated that the remaining RDAs are evident from FIG. 9.

System 900 of FIG. 9 also includes different types of RDADRs. For an example, RDADR 917 is assigned to one specified channel "CH 1," while RDADR 911 is assigned to multiple specified channels "CH5," "CH 6," "CH 7," and "CH 8." In this example, any digital audio signals 909 that are assigned to those channels and received by at least one of the RDAs of system 900 are processed and/or decoded by RDADR 911 and sent to one or more of audio devices 935, 937, 939, and 941. In one embodiment, processors of RDADRs 911, 913, 917, and 95915 are used to determine which of the audio devices of system 900 are to receive one or more digital audio signals 909. For the sake of brevity, it is to be appreciated that the remaining RDADRs are evident from FIG. 9.

System 900 also includes digital bus 951 that couples each of the RDAs, multi-RDAs, and RDADRs of system 900 to one another. For example, digital bus 951 couples the RDAs, multi-RDAs, and RDADRs of system 900 using a daisy chain configuration and the single loop of the daisy configuration creates redundancy so that if any one cable of digital bus 951 fails or is removed, then system 900 can still work due to the bidirectional manner in which digital data is passed via the digital bus 951 to each of the RDAs, multi-RDAs, and RDADRs of system 900. In one embodiment, digital bus 951 is similar to the digital bus 819 that is described above in FIG. 8.

Further, system 900 includes analog/digital buses 953, 954, 955, 956, 957, 958, 959, 960, 961, and 962 that are each used to couple RDADRs 917, 95915, 913, and 911 to audio output devices 949, 947, 945, 943, 941, 939, 937, 935, 927 and 933. In one embodiment, each of analog/digital buses 953, 954, 955, 956, 957, 958, 959, 960, 961, and 962 is similar to analog/digital bus 821 that is described above in FIG. 8.

Figure 10:
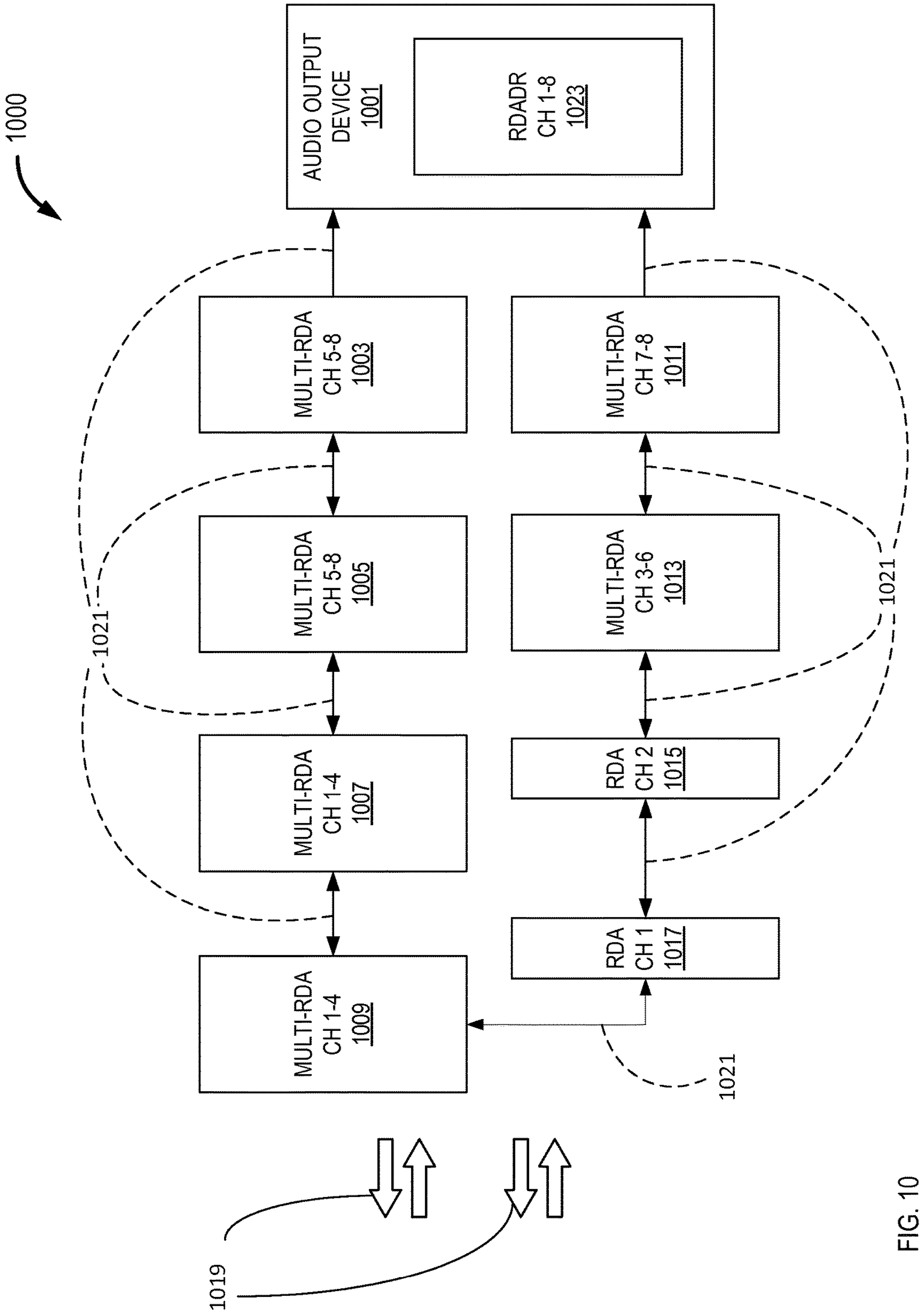
FIG. 10 is a block diagram illustrating a portion of one embodiment of a system for a real-time wireless receiver network that includes multiple RDAs that receive digital audio signals on multiple specified channels and provide the digital audio signals to an audio output device.

FIG. 10 is a block diagram illustrating a portion of one embodiment of a system 1000 for a real-time wireless receiver network that includes multiple RDAs that receive digital audio signals on multiple specified channels and provide the digital audio signals to a single audio output device. The portion of system 1000 described below provides more details about embodiments of systems, such as the systems described above in FIGS. 3 to 9.

In one embodiment of system 1000 of FIG. 10, this portion of system 1000 includes different types of RDAs that have been assigned to at least one specified channel. Given that the systems of FIGS. 3 to 9 have provided most of the descriptions related to RDAs and their assignment to one or more specified channels, that description will be omitted in the discussion of FIG. 10.

Some features, structures, and/or characteristics of system 1000 of FIG. 10 can be similar or the same as some of the corresponding features, structures, or characteristics of the systems of FIGS. 3 to 9 that were described above. For the sake of brevity, only the differences between system 1000 and the systems of FIGS. 3 to 9 will be described in the discussion relating to FIG. 10.

One difference between system 1000 and the systems of FIGS. 3 to 9 relates to the audio output device of system 1000. In one embodiment, configurations of a system for a real-time wireless receiver network, such as system 1000, could exist where there is no direct analog audio output. In one embodiment, the digital bus, such as the digital bus 1021, could be connected directly into an interface on an audio output device, such as audio output device 1001. In one embodiment, audio output device 1001 uses the error-free digital audio signals provided via digital bus 1021 directly in its digital form. In one embodiment, an audio output device, such as audio output device 1001, could be a digital mixer, a computer, and/or any other type of an audio output device that is well known in the art and that can process and/or decode digital audio signals in their digital form. One embodiment of system 1000 shows that there is no need for a separate RDADR, such as the optional RDADR 1023, if the desired audio output is a digital audio output and thus, one embodiment of a system for a real-time wireless receiver network can be reduced in cost and size.

In one embodiment of system 1000, device 1001 and optional RDADR 1023 share tasks of processing and/or decoding the error-free digital signals based on whether the desired audio output is an analog audio output or a digital audio output. In one embodiment, the audio output device 1001 can include one or more modules that enable device 1001 to determine whether the desired audio output is an analog audio output or a digital audio output. If the desired audio output is a digital output, then device 1001 processes and decodes the received error-free digital signals with or without the use of RDADR 1023. In one embodiment, device 1001 turns off RDADR 1023 in response to device 1001 determining that the desired audio output is a digital audio output, and processes the error-free digital signals without the use of RDADR 1023. In one embodiment, device 1001 can share the processing and/or decoding of the error-free digital signals with RDADR 1023 so that the output is provided much faster than when device 1001 performs the tasks without RDADR 1023.

In one embodiment, if device 1001 determines that the desired audio output is an analog output, then device 1001 directs the received error-free digital signals to RDADR 1023 which processes the error-free digital audio signals into an analog audio output. In this embodiment, RDADR 1023 is similar to the one or more of RDADRs 911, 913, 915, and 917 that are described above in FIG. 9, and thus can process the digital audio signals as digital data or convert the processed digital data into analog data that is played back on device 1001. In this embodiment, system 1000 uses one or more processors of RDADR 1023 to process digital data into analog output, even though system 1000 does not include a set of buses that are capable of providing analog data back and forth between the RDAs 1003, 1005, 1007, 1009, 1011, 1013, 1015, 1017 and/or device 1001. Thus, one embodiment of system 1000 for a real-time wireless receiver network can be reduced in cost and size.

In one embodiment, an audio output device, such as device 1001, could be an analog/digital mixer, a computer, and/or any other type of an audio output device that is well known in the art and that can process and/or decode digital audio signals in their analog forms and/or digital forms.

While a system and method for a redundant real-time wireless receiver network and its various functional components have been described in particular embodiments, it should be appreciated the embodiments of a system and method for a redundant real-time wireless receiver network can be implemented in hardware, software, firmware, middleware or a combination thereof and utilized in systems, subsystems, components, or sub-components thereof.

When implemented in software or firmware, the elements of a system and method for a redundant real-time wireless receiver network are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While a system and method for a redundant real-time wireless receiver network has been described with reference to illustrative embodiments, this description is not intended to be construed in a limiting sense. Various modifications of the illustrative embodiments, as well as other embodiments of the system and method for a redundant real-time wireless receiver network, which are apparent to persons skilled in the art to which the system and method for a redundant real-time wireless receiver network pertains are deemed to lie within the spirit and scope of the system and method for a redundant real-time wireless receiver network.

What is claimed is:

1. A system for a real-time wireless receiver network, the system comprising:

a Remote Digital Antenna Digital Receiver ("RDADR") including a processor;

a first Remote Digital Antenna ("RDA") including a processor, at least one receiver, and at least one antenna; and a second RDA including a processor, at least one receiver, and at least one antenna;

wherein the RDADR, the first RDA, and the second RDA are coupled to each other via a digital bus;

wherein the first RDA and the second RDA attempt to simultaneously receive one or more real-time digital signals from a transmitter of an audio source, wherein the audio source includes a musical instrument or a live performance microphone to generate the one or more real-time digital signals, and, if the one or more digital signals are received without an error by one of the first RDA or the second RDA, the RDA that received the one or more error-free digital signals sends the one or more error-free digital signals in real time to the RDADR using the digital bus.

2. The system of claim 1, wherein the first RDA and the second RDA are two RDAs from a multitude of RDAs and wherein only one RDA from the multitude of RDAs needs to obtain the digital signals without an error to send the error-free digital signals to the RDADR using the digital bus.

3. The system of claim 1, wherein the first RDA and/or the second RDA obtains a user command from the RDADR, wherein the first RDA and/or the second RDA attempts to receive the one or more digital signals based on the user command.

4. The system of claim 3, wherein the user command comprises:

information about the one or more digital signals that are to be transmitted by the transmitter;

information about at least one specified channel that will be used to transmit the one or more digital signals; or information about one or more parameters for setting up the first RDA and/or the second RDA.

5. The system of claim 1, further comprising a redundant topology, wherein the redundant topology utilizes the digital bus to couple the RDADR, the first RDA, and the second RDA to each other in at least one of a series configuration, a point-to-point configuration, a bus configuration, a star configuration, a ring configuration, a mesh configuration, a tree configuration, a daisy chain configuration or a hybrid configuration, wherein the redundant topology provides cable redundancy to the system so that if at least one cable of digital bus that is used to couple the RDADR, the first RDA, and the second RDA to each other fails, data that includes the one or more error-free signals can still be transferred via other cables of the digital bus, and wherein the digital bus is at least one of a bidirectional bus, a uni-directional bus, asynchronous bus or a synchronous bus.

6. The system of claim 1 further comprising:

an audio source that is coupled to the transmitter; and an audio output device that is coupled to the RDADR.

7. The system of claim 6 further comprising:

a storage device that is coupled to the audio output device and/or the RDADR, wherein the storage device stores the one or more error-free digital signals.

8. The system of claim 6, wherein the audio source contains the transmitter.

9. The system of claim 6, wherein the audio output device contains the RDADR.

10. The system of claim 6, wherein the audio output device is a play-back device, a computer, an analog mixer, or a digital mixer.

11. The system of claim 6, wherein the audio source generates one or more analog audio signals, and the transmitter further comprises an analog to digital converter that converts the one or more analog audio signals into the one or more digital audio signals and wherein the RDADR further comprises a digital to analog converter that converts the one or more digital signals back into the one or more analog audio signals.

12. The system of claim 1, wherein the live performance microphone is a hand held microphone or a body worn microphone.

13. The system of claim 1, wherein the live performance microphone is mounted on the musical instrument.

14. A method of using a real-time wireless receiver network, the method comprising:

attempting to simultaneously receive one or more real-time digital signals by each of a first Remote Digital Antenna ("RDA") that includes a processor, at least one receiver, and at least one antenna and a second RDA that includes a processor, at least one receiver, and at least one antenna, in real-time from a transmitter of an audio source, wherein the audio source includes a musical instrument or a live performance microphone to generate the one or more real-time digital signals; and if the one or more digital signals are received without an error by one of the first RDA or the second RDA, sending the one or more error-free digital signals, by the RDA that received the one or more error-free digital signals, in real time to a Remote Digital Antenna Digital Receiver ("RDADR") that includes a processor using a digital bus, wherein the RDADR, the first RDA, and the second RDA are coupled to each other via the digital bus.

15. The method of claim 14, wherein the first RDA and the second RDA are two RDAs from a multitude of RDAs and wherein only one RDA from the multitude of RDAs needs to obtain the digital signals without an error to send the error-free digital signals to the RDADR using the digital bus.

16. The method of claim 14, further comprising:

obtaining a user command by the first RDA and/or the second RDA from the RDADR, wherein the attempting to receive one or more digital signals by first RDA and/or the second RDA is based at least on the user command.

17. The method of claim 16, wherein the obtaining a user command by the first RDA and/or the second RDA from the RDADR comprises:

obtaining information about the one or more digital signals that are to be transmitted by the transmitter;

obtaining information about at least one specified channel that will be used to transmit the one or more digital signals; or obtaining information about one or more parameters for setting up the first RDA and/or the second RDA.

18. The method of claim 14, further comprising:

utilizing a redundant topology that includes utilizing the digital bus to couple the RDADR, the first RDA, and the second RDA to each other in at least one of a series configuration, a point-to-point configuration, a bus configuration, a star configuration, a ring configuration, a mesh configuration, a tree configuration, a daisy chain configuration or a hybrid configuration, wherein the redundant topology provides cable redundancy so that if at least one cable of digital bus that is used to couple the RDADR, the first RDA, and the second RDA to each other fails, data that includes the one or more error-free signals can still be transferred via other cables of the digital bus, and wherein the digital bus is at least one of a bidirectional bus, a uni-directional bus, asynchronous bus or a synchronous bus.

19. The method of claim 14 further comprising:

coupling an audio source to the transmitter; and coupling an audio output device to the RDADR.

20. The method of claim 19 further comprising:

storing the one or more error-free digital signals by a storage device, wherein the storage device is coupled to the audio output device and/or the RDADR.

21. The method of claim 19, wherein the audio source contains the transmitter.

22. The method of claim 19, wherein the audio output device contains the RDADR.

23. The method of claim 19, wherein the audio output device is a play-back device, a computer, an analog mixer, or a digital mixer.

24. The method of claim 19 further comprising:

generating one or more analog audio signals by the audio source;

converting the one or more analog audio signals into the one or more digital audio signals, wherein the transmitter further comprises an analog to digital converter that performs the converting the one or more analog audio signals into the one or more digital audio signals; and converting the one or more digital signals back into the one or more analog audio signals, wherein the RDADR further comprises a digital to analog converter that performs the converting the one or more digital signals back into the one or more analog audio signals.

25. The method of claim 14, wherein the live performance microphone is a hand held microphone or a body worn microphone.

26. The method of claim 14, wherein the live performance microphone is mounted on the musical instrument.

27. A non-transitory computer-readable storage medium including executable instructions to perform a method of using a real-time wireless receiver network, the computer readable storage medium comprising executable instructions to:

attempt to simultaneously receive one or more real-time digital signals by each of a first Remote Digital Antenna ("RDA") that includes a processor, at least one receiver, and at least one antenna and a second RDA that includes a processor, at least one receiver, and at least one antenna, in real-time from a transmitter of an audio source, wherein the audio source includes a musical instrument or a live performance microphone to generate the one or more real-time digital signals; and if the one or more digital signals are received without an error by one of the first RDA or the second RDA, send the one or more error-free digital signals by the RDA that received the one or more error-free digital signals in real time to a Remote Digital Antenna Digital Receiver ("RDADR") that includes a processor using a digital bus, wherein the RDADR, the first RDA, and the second RDA are coupled to each other via the digital bus.

28. The non-transitory computer-readable storage medium of claim 27, wherein the first RDA and the second RDA are two RDAs from a multitude of RDAs and wherein only one RDA from the multitude of RDAs needs to obtain the digital signals without an error to send the error-free digital signals to the RDADR using the digital bus.

29. The non-transitory computer-readable storage medium of claim 27 further comprising executable instructions to:

obtain a user command by the first RDA and/or the second RDA from the RDADR, wherein the attempt to receive one or more digital signals by first RDA and/or the second RDA is based at least on the user command.

30. The non-transitory computer-readable storage medium of claim 29, wherein the executable instructions to obtain a user command by the first RDA and/or the second RDA from the RDADR comprises executable instructions to:

obtain information about the one or more digital signals that are to be transmitted by the transmitter;

obtain information about at least one specified channel that will be used to transmit the one or more digital signals; or obtain information about one or more parameters for setting up the first RDA and/or the second RDA.

31. The non-transitory computer-readable storage medium of claim 27, further comprising:

utilizing a redundant topology that includes utilizing the digital bus to couple the RDADR, the first RDA, and the second RDA to each other in at least one of a series configuration, a point-to-point configuration, a bus configuration, a star configuration, a ring configuration, a mesh configuration, a tree configuration, a daisy chain configuration or a hybrid configuration, wherein the redundant topology provides cable redundancy so that if at least one cable of digital bus that is used to couple the RDADR, the first RDA, and the second RDA to each other fails, data that includes the one or more error-free signals can still be transferred via other cables of the digital bus, and wherein the digital bus is at least one of a bidirectional bus, a uni-directional bus, asynchronous bus or a synchronous bus.

32. The non-transitory computer-readable storage medium of claim 27 further comprising executable instructions to:

couple an audio source to the transmitter; and couple an audio output device to the RDADR.

33. The non-transitory computer-readable storage medium of claim 32 further comprising executable instructions to:

store the one or more error-free digital signals by a storage device, wherein the storage device is coupled to the audio output device and/or the RDADR.

34. The non-transitory computer-readable storage medium of claim 32, wherein the audio source contains the transmitter.

35. The non-transitory computer-readable storage medium of claim 32, wherein the audio output device contains the RDADR.

36. The non-transitory computer-readable storage medium of claim 32, wherein the audio output device is a play-back device, a computer, an analog mixer, or a digital mixer.

37. The non-transitory computer-readable storage medium of claim 32 further comprising executable instructions to:

generate one or more analog audio signals by the audio source;

convert the one or more analog audio signals into the one or more digital audio signals, wherein the transmitter further comprises an analog to digital converter and wherein the executable instructions cause the analog to digital converter to convert the one or more analog audio signals into the one or more digital audio signals; and convert the one or more digital signals back into the one or more analog audio signals, wherein the RDADR further comprises a digital to analog converter and wherein the executable instructions cause the digital to analog to convert the one or more digital signals back into the one or more analog audio signals.

38. The non-transitory computer-readable storage medium of claim 27, wherein the live performance microphone is a hand held microphone or a body worn microphone.

39. The non-transitory computer-readable storage medium of claim 27, wherein the live performance microphone is mounted on the musical instrument.

* * * * *